US008290915B2

(12) United States Patent
Anglin (10) Patent No.: US 8,290,915 B2
(45) Date of Patent: Oct. 16, 2012

(54) RETRIEVAL AND RECOVERY OF DATA CHUNKS FROM ALTERNATE DATA STORES IN A DEDUPLICATING SYSTEM

(75) Inventor: Matthew J. Anglin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 12/210,879

(22) Filed: Sep. 15, 2008

(65) Prior Publication Data

US 2010/0070478 A1    Mar. 18, 2010

(51) Int. Cl.
*G06F 7/00* (2006.01)
*G06F 17/00* (2006.01)
(52) U.S. Cl. ......... 707/692; 707/652; 707/675; 707/770
(58) Field of Classification Search ........... 707/999.205, 707/652, 675, 692, 770, 821, 822
See application file for complete search history.

(56) References Cited

U.S. PATENT DOCUMENTS

| 5,479,654 A | 12/1995 | Squibb |
| 5,990,810 A | 11/1999 | Williams |
| 6,523,019 B1 | 2/2003 | Borthwick et al. |
| 6,889,297 B2 | 5/2005 | Krapp et al. |
| 6,934,714 B2 | 8/2005 | Meinig |
| 7,043,727 B2 | 5/2006 | Bennett et al. |
| 7,065,619 B1 | 6/2006 | Zhu et al. |
| 7,092,956 B2 | 8/2006 | Ruediger |
| 7,116,249 B2 | 10/2006 | McCanne et al. |
| 7,143,091 B2 | 11/2006 | Charnock et al. |
| 7,200,604 B2 | 4/2007 | Forman et al. |
| 7,356,730 B2 | 4/2008 | Ulrich et al. |
| 7,584,338 B1 | 9/2009 | Bricker et al. |
| 7,913,114 B2* | 3/2011 | Leppard .......................... 714/15 |

(Continued)

FOREIGN PATENT DOCUMENTS

WO    WO 2007/042954 A2    4/2007

OTHER PUBLICATIONS

"Data Corruption: Dedupe's Achilles Heel", By: Henry Newman; Published: Jul. 22, 2008 http://www.enterprisestorageforum.com/continuity/features/article.php/3759391/Data-Corruption-Dedupes-Achilles-Heel.htm.*

(Continued)

*Primary Examiner* — Apu Mofiz
*Assistant Examiner* — Chelcie Daye
(74) *Attorney, Agent, or Firm* — Kunzler Law Group, PC (57) ABSTRACT

One aspect of the present invention includes retrieving and recovering data chunks from alternate data stores in a storage management system which utilizes deduplication. In one embodiment, deduplication information for data chunks of data objects is stored at a system-wide level to enable the transfer and access of data chunks stored among multiple storage pools. When a data object is accessed on a first storage pool that contains damaged or inaccessible data chunks, the undamaged and accessible chunks may be retrieved from the first storage pool, in addition to retrieving an undamaged copy of the damaged or inaccessible data chunks from alternate data storage pools. Thus, a complete data object can be retrieved or recovered with a combination of chunks from the first storage pool and other storage pools within the storage management system, without requiring the entire data object to be retrieved from a backup source.

18 Claims, 9 Drawing Sheets

U.S. PATENT DOCUMENTS

| | | |
|---|---|---|
| 2002/0116402 A1 | 8/2002 | Luke |
| 2005/0268068 A1 | 12/2005 | Ignatius et al. |
| 2006/0036901 A1 | 2/2006 | Yang et al. |
| 2007/0208788 A1 | 9/2007 | Chakravarty et al. |
| 2008/0104146 A1* | 5/2008 | Schwaab et al. ............... 707/204 |
| 2008/0243769 A1* | 10/2008 | Arbour et al. ..................... 707/2 |
| 2008/0294660 A1 | 11/2008 | Patterson et al. |
| 2008/0294696 A1 | 11/2008 | Frandzel |
| 2009/0182789 A1* | 7/2009 | Sandorfi et al. ............... 707/204 |
| 2009/0204636 A1 | 8/2009 | Li et al. |
| 2009/0204652 A1 | 8/2009 | Chikusa et al. |
| 2009/0234892 A1* | 9/2009 | Anglin et al. ................. 707/201 |
| 2010/0042804 A1 | 2/2010 | Ignatius et al. |

OTHER PUBLICATIONS

Jack G. Conrad, "Online Duplicate Document Detection: Signature Reliability in a Dynamic Retrieval Environment," 2005, pp. 443-452.

Lise Getoor, "Link Mining: A Survey," 2005, pp. 3-12.

Andrew McCallum, "Extraction: Distilling Structured Data from Unstructured Text," ACM QUEUE, Nov. 2005, pp. 49-57.

G. Niklas Noren, "A Hit-Miss Model for Duplicate Detection in the WHO Drug Safety Database," Aug. 2005, 10 pages.

Periklis Andritsos, "Information-Theoretic Tools for Mining Database Structure from Large Data Sets," Jun. 2004, 12 pages.

* cited by examiner

RETRIEVAL AND RECOVERY OF DATA CHUNKS FROM ALTERNATE DATA STORES IN A DEDUPLICATING SYSTEM

FIELD OF THE INVENTION

The present invention generally relates to data deduplication activities in a data storage management system. The present invention more specifically relates to operations used for retrieving and recovering data chunks from data stores within a storage management system that provides a repository for computer information that is backed up, archived, or migrated from client nodes in a computer network.

BACKGROUND OF THE INVENTION

The basic premise of a data deduplication system is that data stored into the system must be analyzed, broken into pieces (commonly referred to as "chunks"), duplicate chunks identified (each unique chunk is given a digital signature strong enough to declare that two chunks with the same signature are actually the same data), and duplicate chunks eliminated. Normally, as the deduplication system breaks apart larger objects into chunks, it must keep track of the individual chunks which make up the larger object, so the larger object can be retrieved when desired.

Deduplication reduces space requirements by eliminating redundant chunks of data objects and replacing them with links or pointers to the single remaining chunk. Generally speaking, there must be some type of index or database to keep track of the chunks of a larger object so that the larger object can be reassembled and retrieved after deduplication has removed the redundant chunks. Furthermore, the database used to track the chunks is generally embedded within the deduplication system. In other words, the deduplication system knows about its objects and chunks, but does not generally share this chunk information with any other system.

The deduplication system may be embodied in a storage management system that spans multiple storage volumes and storage pools. For example, data may be sent by storage management clients or data protection agents to the storage management server for storage. One characteristic of a storage management system is that data can be copied for redundancy, transferred to a new media type, or moved to reclaim unused space from deleted objects. Data redundancy and deduplication, in fact, work well together in a storage management system, because the more data that is deduplicated, the more important it is to have some backup copies of the data within the storage management system to help protect overall data integrity.

A storage management system typically stores copies of objects on separate media, so that loss of a piece of media due to a hardware error or other failure will not compromise the data within the storage management system. Alternatively, data can be moved from one storage location to another, either within the same storage pool or between storage pools. The configuration of existing storage management systems, however, does not enable a simple transfer of data chunks when attempting to perform certain data retrieval and recovery operations on deduplicated storage pools.

Within existing storage management systems, data stored in one deduplicating pool cannot be shared with, or deduplicated against, data stored in a different deduplicating pool. Thus, if a chunk in one deduplicating pool is lost (for example, due to hardware error), then this results in two side effects. First, the single damaged chunk cannot be retrieved from another storage pool during a data retrieval operation. Restated, if a 10.5 gigabyte data object is being restored from some storage pool, and all data is transferred successfully until the process encounters a damaged chunk at the 10.4 gigabyte mark, the entire object would need to be retrieved from a different storage pool.

Additionally, in existing storage management systems, an undamaged copy of only the damaged data chunk cannot be recovered from another storage pool. Storage management systems do have the ability to perform a storage pool recovery operation which replaces damaged copies of objects in one pool with a good copy in another pool, but this is performed on the entire object. Because data chunks are not shared across pools, there is no capability of transferring a single data chunk.

What is needed is a method to retrieve and/or recover data chunks from alternate data stores in a deduplicating storage management system without the need to unnecessarily transfer or access the entire data object containing the data chunks.

BRIEF SUMMARY OF THE INVENTION

One aspect of the present invention enables retrieval and recovery of data chunks from alternate data stores in a storage management system that utilizes deduplication. Accordingly, one embodiment of the present invention solves the various limitations of existing deduplication systems by keeping deduplication information on a storage management system-wide level, instead of at a deduplicating pool level. Even though some storage pools within the system may be deduplicating and some may not, the information on deduplication is stored at a higher level, allowing data to be segregated when necessary. This configuration enables the flexibility of moving individual chunks from one pool to another to preserve the integrity of each pool individually, and the system collectively.

In one embodiment of the present invention, the operation for performing retrieval and recovery of data chunks from alternate data stores within a storage management system enables damaged or inaccessible data chunks to be retrieved and/or recovered from other storage pools within the storage management system. This operation is applicable to data objects which are stored on a plurality of storage pools within the storage management system, split into data chunks, and deduplicated on one or more of the storage pools.

In this embodiment, when a data object on a first storage pool is detected as containing one or more damaged or inaccessible data chunks within the data object, another copy of the damaged chunk(s) is retrieved from an alternate data store. Undamaged and accessible data chunks of the data object may continue to be retrieved from the first storage pool, and an undamaged copy of the damaged or inaccessible data chunk(s) may be retrieved from one or more alternate storage pools in the storage management system. The data object can then be assembled and provided from a combination of the undamaged and accessible chunks retrieved from the first storage pool, and the chunks retrieved from the one or more alternate storage pools.

In a further embodiment, the capability of accessing individual chunks is enabled by tracking deduplication information for the data object in an index within the storage management system. Because the deduplication information is accessible by each of the plurality of storage pools, chunks can be easily identified among alternate deduplicating and non-deduplicating storage pools. Additionally, one or more of the alternate storage pools may comprise tape storage media.

Another embodiment of the present invention enables only the undamaged copies of the data chunks that are damaged or inaccessible to be retrieved from the one or more alternate storage pools. Restated, only "replacement" chunks are retrieved from alternate storage pools, as each of the good data chunks on the first storage pool are read and utilized when reassembling the object. In an alternate embodiment, the remaining data chunk(s) of the data object are retrieved from one or more of the alternate storage pools after the first damaged or inaccessible data chunk is detected on the first storage pool.

In a further embodiment, any damaged, inaccessible, or missing chunks of the data object on the first storage pool are replaced by the undamaged copy of the data chunk(s) retrieved from the alternate storage pool(s). Damaged chunks are typically replaced during a storage pool recovery or similar operation. The recovery of data chunks includes creating a new data object on the first storage pool that contains an undamaged copy of each chunk to be replaced on the first storage pool. References to damaged and inaccessible data chunks are then updated to reference the data chunk copies now existing in the new data object in the first storage pool.

DETAILED DESCRIPTION OF THE INVENTION

One aspect of the present invention includes enabling the efficient transfer of deduplicated data between storage pools in a storage management system without the need to re-assemble and unnecessarily deduplicate data chunks. In one embodiment of the present invention, efficient transfer of data between storage pools is facilitated by storing deduplication information on a storage management system level, rather than at the deduplicating pool level. Even though some storage pools within the system may deduplicate data and other storage pools may not, the information relevant to deduplication activities is stored at a higher, storage management system level. This enables data to be segregated within distinct pools of the storage management system, while facilitating the flexibility to move individual chunks from one storage pool to another and preserve the integrity of each pool individually and the system collectively.

A further aspect of the present invention includes a new and enhanced operation for retrieving and recovering data from a storage management system. The retrieval of an object in a deduplication system generally involves the process of retrieving the data of each chunk in sequence until the entire object is retrieved. In one embodiment of the present invention, since the chunks are indexed across all storage pools in the storage management system, if a particular chunk in a storage pool is damaged or inaccessible and cannot be retrieved, the chunk can be read from another pool without restarting the entire retrieval operation.

A storage pool is broadly defined as a set of volumes that have similar characteristics, such as physical, segmentation, or redundancy characteristics. For example, a storage management system may have a plurality of storage pools that are broken up by device type, such as a primary storage pool on disk and a backup copy pool on tape. When the storage management client sends a data object (whether it is for backup, archive, or any other purpose), it is the responsibility of the storage management system to safeguard that copy of the data. To that end, one best practice is to have the storage management system make a redundant copy of the data, which may even include moving the redundant copy off-site for disaster-recovery scenarios. Similarly, storage pools may separate sets of data from each other based on physical segmentation requirements (e.g., regulatory requirements to keep sensitive data separated within different storage pools). A primary characteristic of storage pools currently existing in the art, however, is that each file within a storage pool will be stored as a complete file within the storage pool.

Deduplicating storage pools (or "deduplication systems") operate by taking large data objects and breaking them up into chunks using a fixed- or variable-sized chunking algorithm, such as Rabin Fingerprinting. The chunks are then digested to generate a unique digital signature (using SHA1, for example). Furthermore, as each object is broken up, a list of chunks is maintained so that the original object can be reconstructed.

In one embodiment of the present invention, these basic chunking and digesting activities are performed as in a typical deduplication system. Instead of tracking the deduplication information for each storage pool in which the data resides, the information is tracked in an index or table at a higher level in the database of the storage management system.

Through use of the present invention, once an object has been processed, the fundamental structure of the object is changed, not merely in the scope of the individual deduplicating pool, but rather in the scope of the entire storage management system. Accordingly, a further aspect of the present invention eliminates the inefficiency of re-assembling and repeating deduplication of transferred data. Because deduplication information is stored above the storage pool layer, the storage management system is able to move data between storage pools at a chunk-level without having to re-chunk or re-digest each piece of data.

Similarly, once data is stored in a deduplication pool within the storage management system, it would be inefficient to recalculate the values for the various chunks of the data object when moving it to another storage pool. Thus, once the data is analyzed according to this embodiment of the present invention, it is analyzed for as long as the object resides in the storage management system, and all that is required to establish access to the chunks is to find matching chunks within the index.

Figure 1:
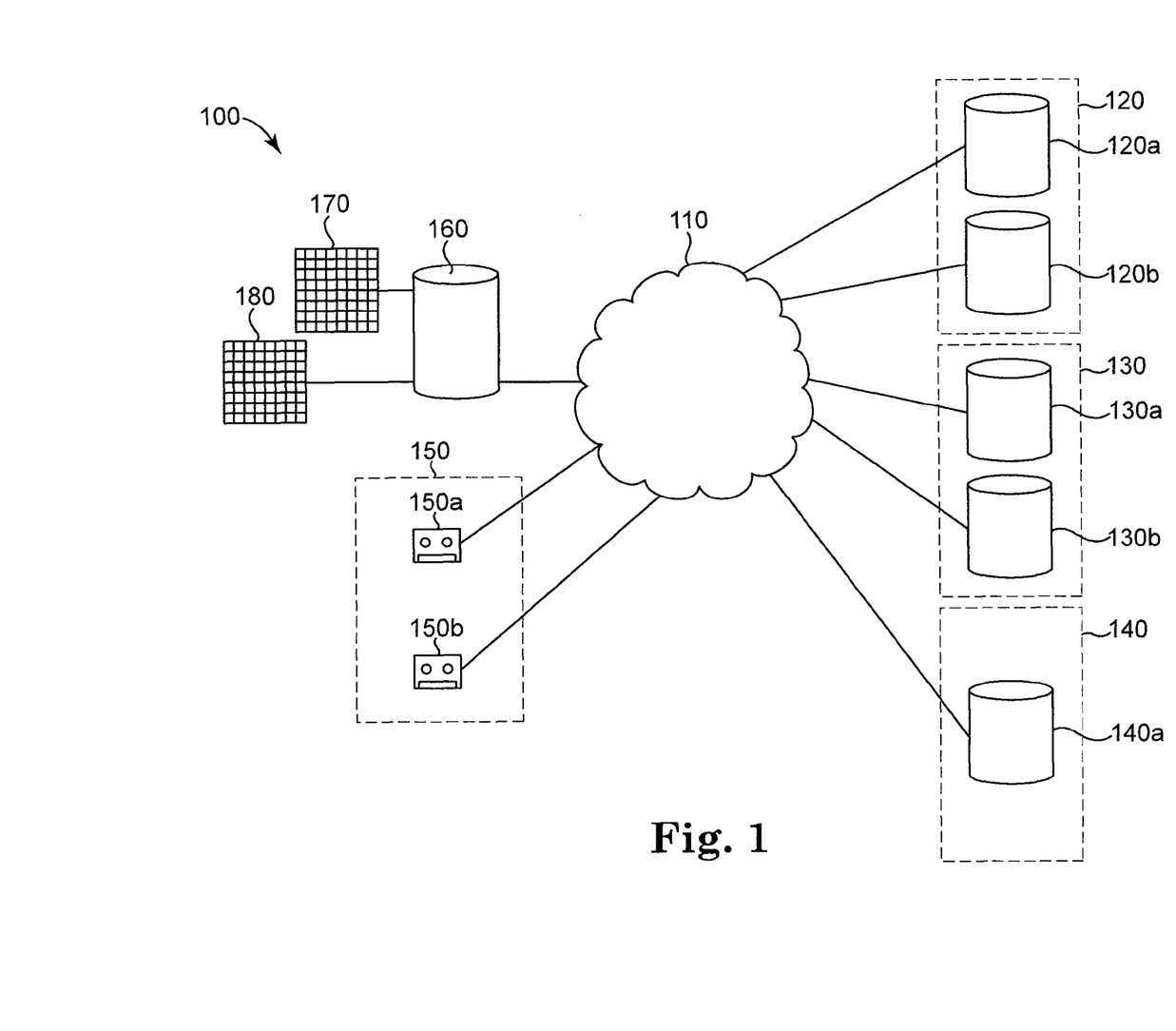
FIG. 1 illustrates an example operational environment of a storage management system according to one embodiment of the present invention.

An example operational environment for the present invention is depicted in FIG. 1, which demonstrates a storage management system 100 operating over a network 110. The storage management system 100 includes a number of storage pools 120, 130, 140 where data is stored during its normal operation within the storage management system. The storage pools include storage disks 120a, 120b, 130a, 130b, and 140a accessible over the network 110.

The storage management system 100 further includes a "copy pool" 150 to contain backups of data objects that are stored in the various storage pools. The copy pool 150, which is implemented in this embodiment in the form of tape backup systems 150a and 150b, may also be implemented by other suitable backup means.

The storage management system 100 further includes a database 160 that contains two indexes 170 and 180. Index 170 tracks the location of data objects stored throughout the storage management system 100 and thus tracks the location of specific data objects within the storage pools or copy pool. Index 180 tracks deduplication information for objects which have been deduplicated within the storage management system.

Figure 2:
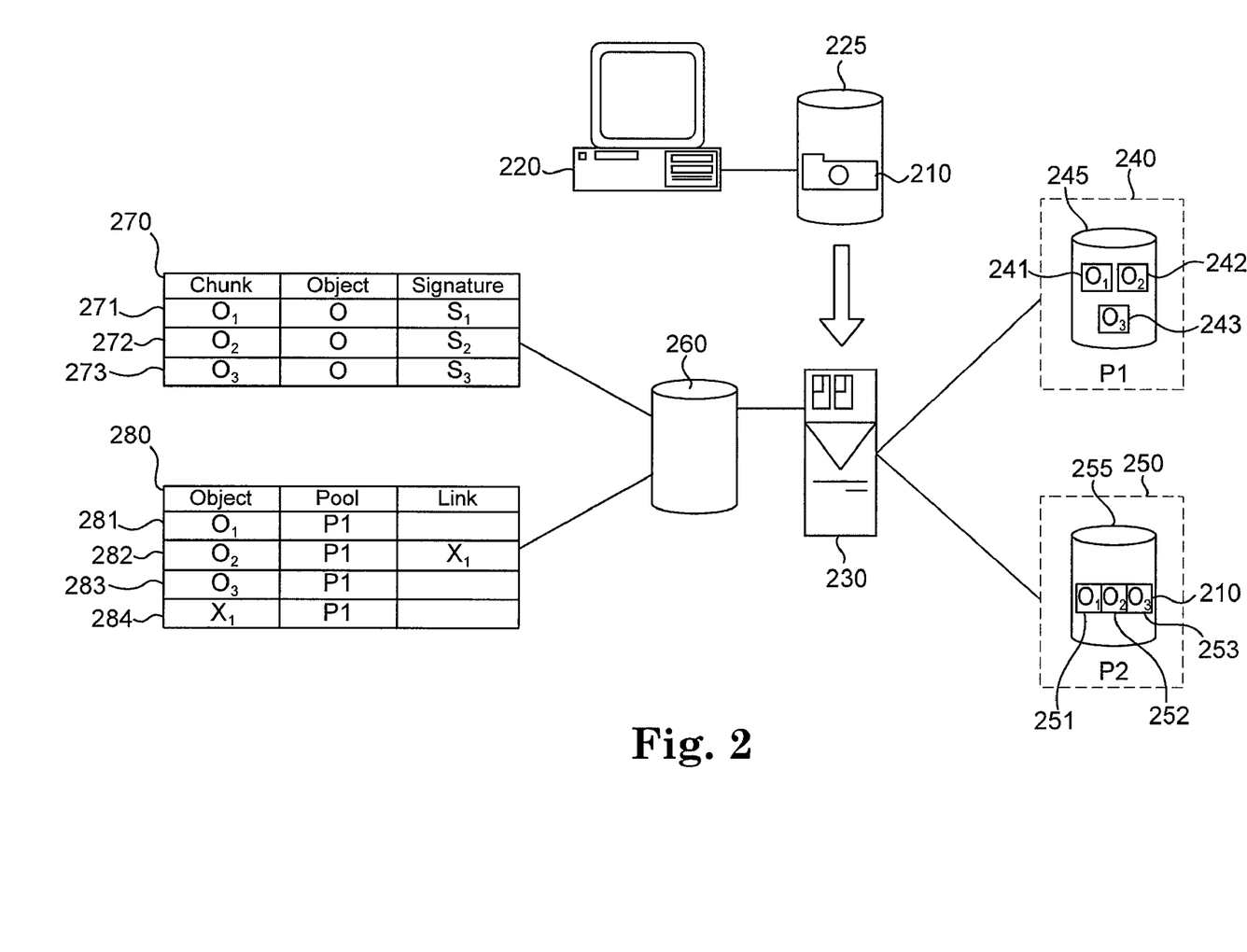
FIG. 2 illustrates an example operation of storing data on a storage management system configured to enable the transfer data between storage pools according to one embodiment of the present invention.

An example operation of storing data on a storage management system configured to enable the transfer data between storage pools according to one embodiment of the present invention is depicted in FIG. 2. As depicted, object O 210 is transferred from a volume 225 on a storage management client 220 to the storage management server 230 for storage (perhaps as a backup, archive, etc). Upon import into the storage management system, the data object 210 is intended to be stored on a volume 245 within a first storage pool P1 240 inside the storage management system. Assume that this data object O 210 is also concurrently stored on a volume 255 within a second storage pool 250 inside the storage management system, such as through the use of a simultaneous write feature that makes two or more separate copies as the data is being received by the server 230. Further assume that the first storage pool P1 240 is a deduplicating pool (i.e., performs deduplication for data objects on all volumes within its pool), and that the second storage pool P2 250 is a non-deduplicating pool.

After the data object 210 is imported into the storage management system, the data will be stored in the first storage pool P1 240 in deduplicated form and in the second storage pool P2 250 without deduplication. Although FIG. 2 suggests the deduplication process occurs during ingestion to the storage management system, the same results of this embodiment of the present invention may be achieved through use of a post-ingestion deduplication process.

As a result of deduplication on the first storage pool 240, object O becomes pieces $O_1$ 241, $O_2$ 242, and $O_3$ 243, where $O_1$ 241, $O_2$ 242, and $O_3$ 243 represent the three pieces into which object O was chunked. Accordingly, the deduplication information containing the ownership and digital signatures of the chunks are stored with an entry for each chunk in an index 270 at the storage management system level. As depicted in index 270, for each chunk $O_1$, $O_2$, and $O_3$, there are rows 271-273 to include an entry for the chunk, the object associated with the chunk, and the signature of the chunk. This deduplication information stored in index 270 can then be used to easily reassemble the object at a later time. For example, the index 270 will indicate to the storage management system that chunks $O_1$, $O_2$, and $O_3$ are necessary to reassemble object O. Additionally, this deduplication information may include the sequence number of each chunk which indicates the sequence that the chunks need to be reassembled in to successfully reassemble object O.

Even though object O has only been deduplicated within the first storage pool P1 240, the storage management system is able to easily establish that object O stored within any pool is comprised of chunks $O_1$ 241, $O_2$ 242, and $O_3$ 243. As depicted in FIG. 2, the storage management system tracks each copy of object O within the storage management system in a storage information index 280. The storage information index 280 contains an entry for each object, details of which pool the copy of the object is stored in, and linking information if the object is linked to other objects in the storage management system. Additionally, this storage information may include the number of references to the instance of the data object, and the signature of the data object.

In FIG. 2, there is a storage information index 280 further depicted containing storage information for the deduplicated data chunks. After deduplication, once object O has been broken into chunks $O_1$-$O_3$, the storage management system does not track object O as an entity in the indexes (indices) related to storage location. The storage management system does track object O at some level, because the storage management client may someday ask for object O to be retrieved. From a perspective of the object storage location, however, the storage management system tracks $O_1$-$O_3$ as individual items, in addition to reassembly information for object O.

Accordingly, as shown in the storage information index 280, there is an entry 281 for chunk $O_1$ in pool P1 240 with no link, an entry 282 for chunk $O_2$ in pool P1 240 with a link to object $X_1$, an entry 283 for chunk $O_3$ in pool P1 with no link, and an entry 284 for object $X_1$ in pool P1 with no link. In this case, object $X_1$ represents a chunk from an existing object X, previously deduplicated and stored in the storage pool.

Since pool P2 is not a deduplicating pool, there are not entries in table 280 for the objects within pool P2 250. However, as shown on volume 255 in pool P2 250, object O has been split up into chunks $O_1$-$O_3$ 251-253, although all of the chunks are stored in a contiguous fashion in the pool.

Accordingly, if deduplication is turned off in a pool, or an object is deleted from the pool, the record for the object is deleted within the object index 280, but the deduplication information for the object remains intact in the system-wide deduplication information index 270. Similarly, if deduplication is turned on in a pool again, all that needs to be done is to re-create links for the deduplicated object in the storage information index 280 from the information for the object in index 270.

As depicted in FIG. 2, to fully enable retrieval of object O from deduplicating or non-deduplicating pools, object O is mapped to objects $O_1$-$O_3$ in the system-wide database. When an attempt is issued to access object O from a storage pool, the storage information index 280 is accessed to determine if chunks $O_1$-$O_3$ are stored as objects $O_1$-$O_3$ or whether the chunks are linked to other chunks in the pool. For example, to retrieve object O from deduplicating pool P1 240, the system must retrieve objects $O_1$ 241, $X_1$ (linked by $O_2$), and $O_3$ 243. In this case, $O_2$ is not stored in the pool, so the link is followed to obtain $X_1$. In the non-deduplicating pool P2 250, however, each of the chunks $O_1$-$O_3$ 251-253 exist in the pool, and no links are involved. Because $O_1$-$O_3$ are contiguous in the non-deduplicating pool P2 250, these chunks can be retrieved in sequential order to fully retrieve object O. In contrast, for the deduplicating pool P1 240, after $O_1$ 241 is retrieved, the link is followed to retrieve $X_1$ for $O_2$ (which may even reside on a different volume), followed by returning to the first volume to retrieve $O_3$ 243. In both cases, each of the chunks $O_1$-$O_3$ are retrieved, but a deduplicating pool may involve following a link for a duplicate chunk.

As is evident, by storing deduplication information in an index or database within the storage management system, rather than at the storage pool level, the system can easily move data between pools in the storage management system. Thus, deduplication information is preserved even if the pool to/from which it is moved is not a deduplicating storage pool. One skilled in the art would recognize that there are a variety of possible configurations and database operations available to successfully track and reconfigure the relevant deduplication and storage information of the data chunks and data objects.

Figure 3:
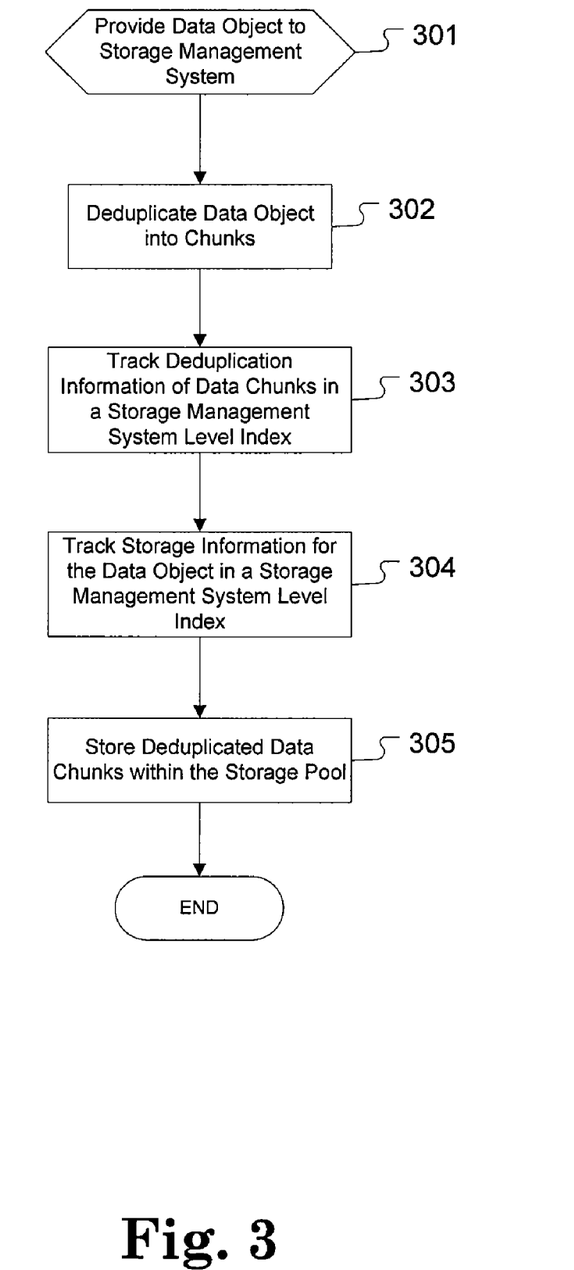
FIG. 3 illustrates a flowchart representative of an example operation of enabling the efficient transfer of deduplicated data within a storage management system according to one embodiment of the present invention.

An example operation of enabling the efficient transfer of deduplicated data within a storage management system according to one embodiment of the present invention is depicted in FIG. 3. This operation demonstrates the initial placement of deduplication and reassembly information for the data object into the deduplication information index 270, and placement of storage information for the data object's deduplicated chunks in the storage information index 280 for deduplicating pools.

First, the data object is provided to the storage management system as in step 301. Next, the data object is deduplicated into a number of chunks as in step 302. The deduplication information obtained for each of the chunks is then stored and tracked in an index located at the storage management system level as in step 303. As discussed above with reference to FIG. 2, this deduplication information may include the ownership of the chunk, the digital signature of the chunk, and the sequence of the chunk within the data object.

Additionally, the storage information for the data object is tracked in an index at the storage management system level as in 304. As also discussed above with reference to FIG. 2, this storage information may include identification of the object, identification of the object pool, number of references to the object, information to link the object to another object, and/or the signature of the object. To complete the deduplication process, the deduplicated data chunks are stored as necessary within the storage pool as in 305.

After completion of the operation depicted in FIG. 3, the data object has been analyzed and deduplicated in at least one deduplicating storage pool. It is possible that this data object is also stored in one or more non-deduplicating pools in addition to being stored within one or more deduplicating pools.

Figure 4:
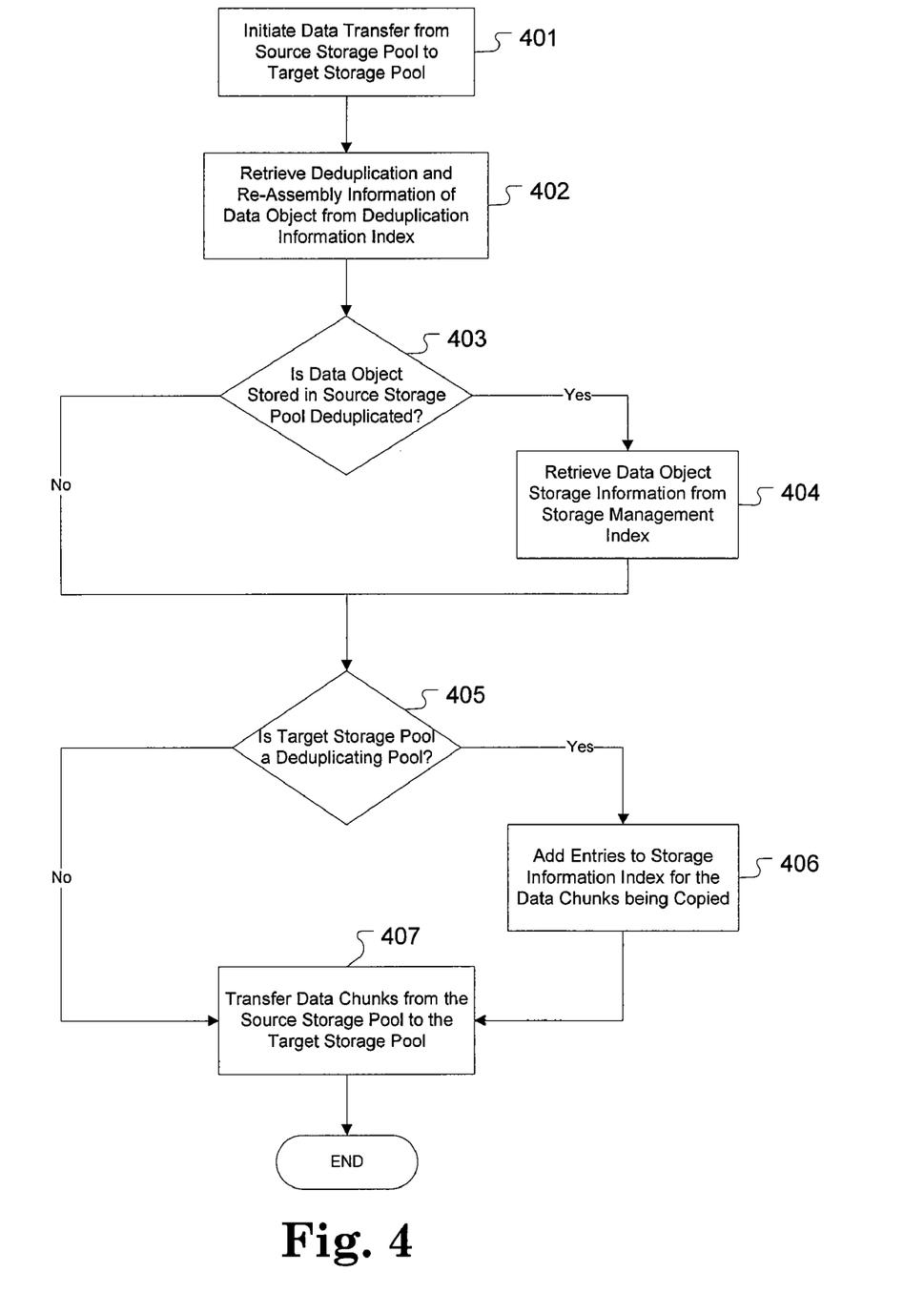
FIG. 4 illustrates a flowchart representative of an example operation of performing the efficient transfer of deduplicated data within a storage management system according to one embodiment of the present invention.

FIG. 4 depicts the operation of an efficient data transfer taking place at a later time between a source storage pool and a target storage pool within the storage management system according to a further embodiment of the present invention. This operation occurs within the storage management system after the data is deduplicated, tracked, and stored consistent with the method depicted in FIG. 3.

Although the method within FIG. 3 involves deduplicating the data object and storing it within at least one deduplicating storage pool, the efficient transfer of data between storage pools within FIG. 4 is applicable to data transfers involving any combination of deduplicated and non-deduplicated storage pools. One example scenario where a transfer from a non-deduplicated pool to a deduplicated pool would be performed is if data in the primary pool becomes damaged or inaccessible and therefore needs to be restored from a non-deduplicated copy pool. Additionally, the steps depicted in FIG. 4 can be performed multiple times, so data can be transferred among deduplicating and non-deduplicating pools in any sequence.

As shown in step 401, a data transfer is initiated from a source storage pool to a target storage pool. This data transfer may be in the form of a copy (a transfer to the target location which leaves the data object at the source location) or a move (a transfer followed by deletion of the object at the source location). Next, as in step 402, the deduplication and reassembly information of the data object is retrieved from the deduplication information index 270, even if the data transfer is occurring to or from a non-deduplicated pool.

In the case that the data object stored in the source storage pool is deduplicated per step 403, then the storage information for the deduplicated data object is retrieved from the index 280 at the storage management level as in step 404. Step 404 is not necessary for the transfer of a non-deduplicated data object, because the data chunks are stored contiguously.

It is important to note that even if the data object stored on the source storage pool is not stored in deduplicated form, the data object will still have been broken into chunks, and deduplication information for these chunks will be stored in the deduplication information index 270 at the storage management system level. All of the chunks for the data object, however, will be present and contiguous in the non-deduplicated storage pool (thereby facilitating faster retrieval of the non-deduplicated object).

Next, if the target storage pool is a deduplicating pool as in step 405 (i.e., the data transfer is taking place from a non-deduplicating pool to a deduplicating pool, or from a deduplicating pool to a deduplicating pool), the data does not need to be analyzed again, and duplicated data chunks already existing on the target storage pool do not need to be transferred from the source storage pool. The information from the deduplication information index 270 can be used to easily create the deduplicated data by establishing the necessary entries in the storage management index 280 as in step 406.

Additionally, if the target storage pool is a deduplicating pool, the storage information index 280 is examined for entries in the target storage pool to see if matching chunks already exist. If matching entries exist in the target storage pool, then the chunks are not transferred in step 407, so the entries for those chunks in the storage information index 280 will have a value in the link column. If there is no match, the chunk is copied as in step 407, and the entry for the chunk in the storage information index 280 will reflect no link. The storage management system, however, continues to track the deduplication information for the data chunks and the storage information for the data objects whether or not a data transfer ever occurs.

If the target storage pool is a non-deduplicating pool per step 405, the only operation which needs to be performed is a transfer of each of the data object's data chunks from the source storage pool (which may be either a duplicating or non-deduplicating storage pool) to the target non-deduplicating storage pool as in step 407.

As depicted in FIG. 4, deduplication may be easily performed for data that is being transferred from a non-deduplicating pool to a deduplicating pool, because the signatures of the data chunks are already tracked at the system-wide level in the deduplication information index 270. Accordingly, this embodiment allows the storage management system to bypass a deduplication analysis which would otherwise be needed to determine if duplicate chunks exist on the target volume.

The storage management system utilized in FIGS. 3 and 4 continues to track the deduplication information for the data chunks and the storage information for the data objects whether or not a data transfer of the data object ever occurs. Additionally, even if a data object is deleted from a storage pool, deduplication information is available for the object as long as it still exists in any one storage pool, and this information can be applied to all storage pools. However, once an object has been completely deleted from the storage management system, its deduplication information is removed.

Figure 5A:
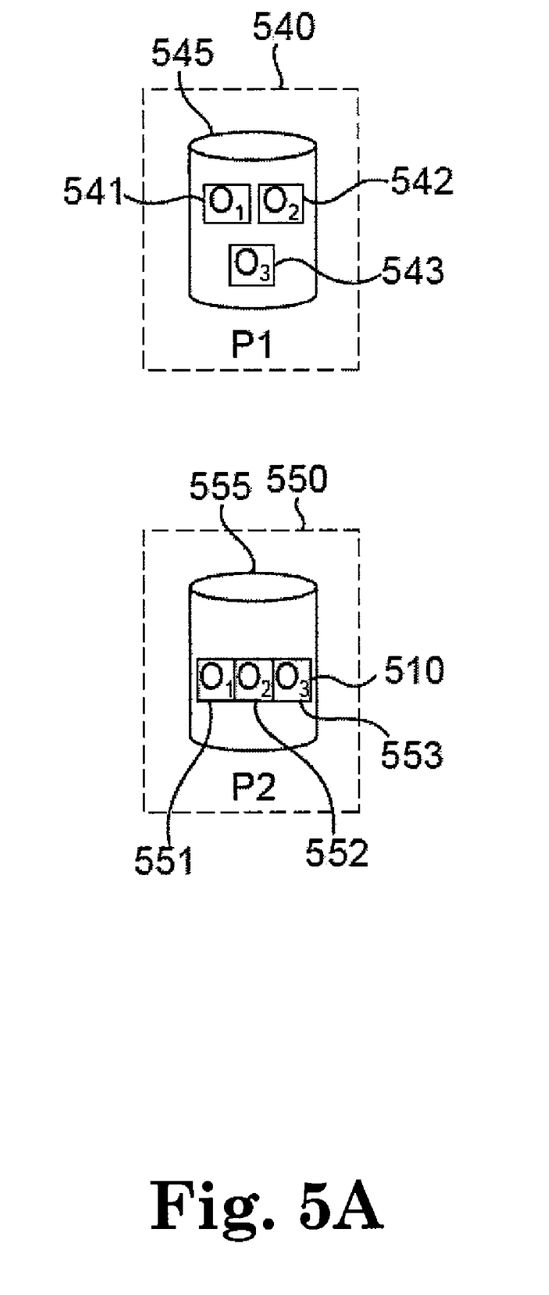
FIG. 5A illustrates an example configuration of storage pools within a deduplicating storage management system utilized according to one embodiment of the present invention.
Figure 5B:
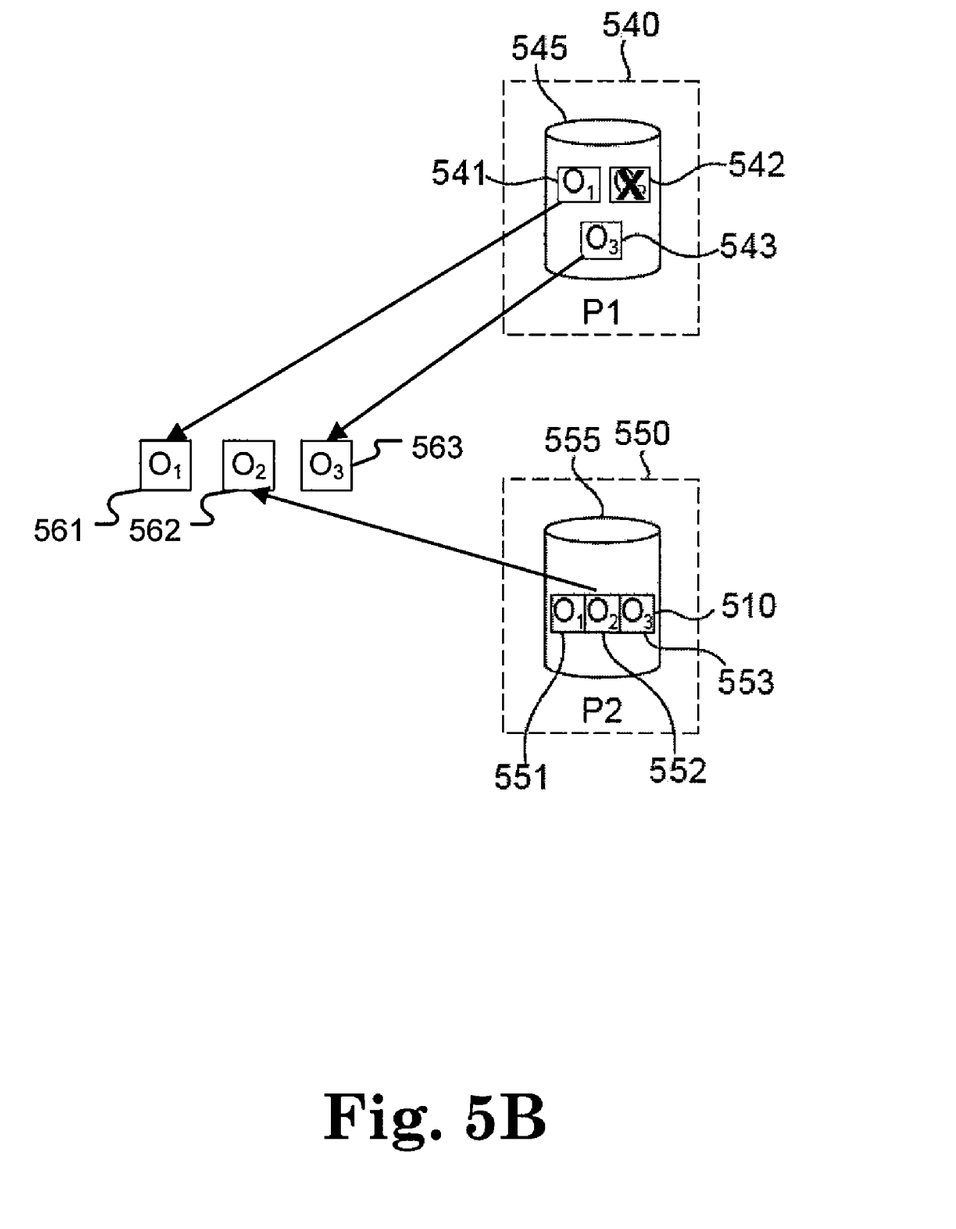
FIG. 5B illustrates an example operation of retrieving data chunks from multiple storage pools in a deduplicating storage management system according to one embodiment of the present invention.
Figure 5C:
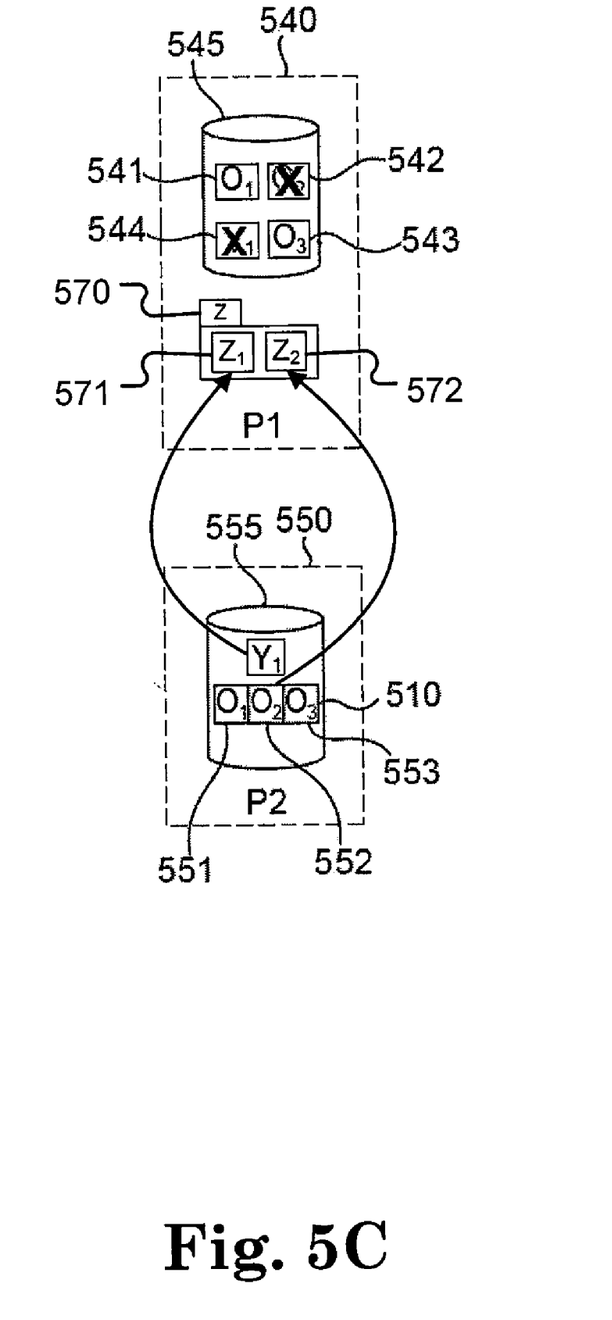
FIG. 5C illustrates an example operation of recovering data chunks from multiple storage pools in a deduplicating storage management system according to one embodiment of the present invention.

FIGS. 5A-5C illustrate an example configuration of storage pools used with an enhanced operation for enabling the retrieval and recovery of data within a storage management system in accordance with one embodiment of the present invention. By indexing the deduplication information for the data chunks at the storage management system level, each of the data chunks may be indexed across all storage pools in the storage management system. Therefore, if a particular chunk stored in a storage pool is damaged or otherwise cannot be retrieved, this chunk can be read from another pool within the storage management without restarting the entire retrieval operation. Additionally, by retrieving only the particular chunk which is needed, this enhanced operation avoids an unnecessary retrieval of the data chunk's entire data object.

As depicted in FIG. 5A, object O in pool P1 540 has been chunked into objects $O_1$ 541, $O_2$ 542, and $O_3$ 543. Once this object has been chunked for pool P1 540, it is inherently chunked for all pools, since the chunking needs to be performed within the storage management system only once. Therefore, if object O had been copied to pool P2 550 as a redundancy operation in the storage management system before it had been chunked, then it would have existed as O in both pools P1 540 and P2 550 until the time it was chunked in pool P1 540.

Moreover, after the chunking and deduplication is performed on pool P1 540, the data object becomes chunked automatically in all pools P1 540 and P2 550. A retrieval request for object O from either pool would be satisfied by retrieving, individually, each of the $O_1$, $O_2$, and $O_3$ data chunks.

FIG. 5B illustrates a scenario where data chunk $O_2$ 542 has become unreadable within pool P1 540. To retrieve object O, the storage management system can simply retrieve $O_1$ 541 from pool P1 540, $O_2$ 552 from pool P2 550, and $O_3$ 543 from pool P1 540, to produce copies of these chunks 561, 562, 563. There is no need to retrieve the entire object O from pool P2 550, nor is there a need to restart the transfer of the entire object O when the damaged chunk is encountered.

Generally, when retrieving objects from a storage management system, it is desirable to retrieve from disk rather than tape, due to the increased speed and accessibility of disk media. However, if the disk version of the data object becomes damaged (as is depicted in FIG. 5B, where chunk $O_2$ 542 on pool P1 540 has become damaged), then it may be necessary to go to a tape storage pool to retrieve the missing piece(s) of the data object. Once the damaged chunk has been retrieved from the tape storage, the remaining chunks ($O_3$ in the example in FIG. 5B) can be retrieved either from the original storage pool P1 540 or from the tape storage pool. It is usually desirable to return to the original pool, which is most likely a faster media storage, rather than to continue to retrieve from an alternate pool. In one embodiment of the present invention, even though a tape may be mounted to retrieve a good copy of the damaged chunk, the system is configured to return to the original storage pool (disk media) to retrieve the remaining chunks and therefore increase performance. Thus, as depicted in FIG. 5B, the operation would return to pool P1 540 to retrieve chunk $O_3$ 543.

In a further embodiment of the present invention, a derivation of the storage pool recovery process is used to recover and replace damaged data. Rather than continually go to another pool to retrieve chunks which are unreadable and/or damaged in the original pool, it may be beneficial to replace the damaged chunks in the original from a backup copy. This allows future retrievals to occur directly from the original pool without needing to access data from a backup copy on an ongoing basis. Additionally, this allows the expected redundancy of data to be re-introduced within the storage management system.

A further embodiment of the present invention includes performance of an operation to perform recovery of damaged chunks from either a non-deduplicating or deduplicating source pool to a deduplicating pool. As illustrated in FIG. 5C, storage pool P1 540 contains a broken chunk $O_2$ 542 and another broken chunk $Y_1$ 544 from object Y. To restore both broken chunks $O_2$ and $Y_1$, an entirely new object is created in pool P1 540 (further referred to as object "Z" 570). Object Z 570 will get two new chunks $Z_1$ 571 and $Z_2$ 572, where $Z_1$ 571 is a valid copy of the chunk $O_2$ restored from pool P2 550 and, and $Z_2$ 572 is the chunk $Y_1$ restored from pool P2 550 (although either chunk may originate from another pool). Therefore, object Z 570 is nothing but a container for broken chunks restored from other pools. After placing the contents of object Z 570 in pool P1 540, broken chunk $O_2$ 542 is updated to link to $Z_1$ 571. Similarly, broken chunk $Y_1$ 544 in pool P1 540 is updated to link to chunk $Z_2$ 572. Therefore, this recovery operation does not replace broken chunks $O_2$ 542 and $Y_1$ 544 in the storage pool. Instead, new chunks are added to the storage pool, and links are created from the existing broken entries to these new chunks. This linking is done via the storage information index to simply utilize the object Z and its chunks. Additionally, after the links to the new chunks in Z are established, the storage for broken chunks $O_2$ and $Y_1$ is freed.

Figure 6:
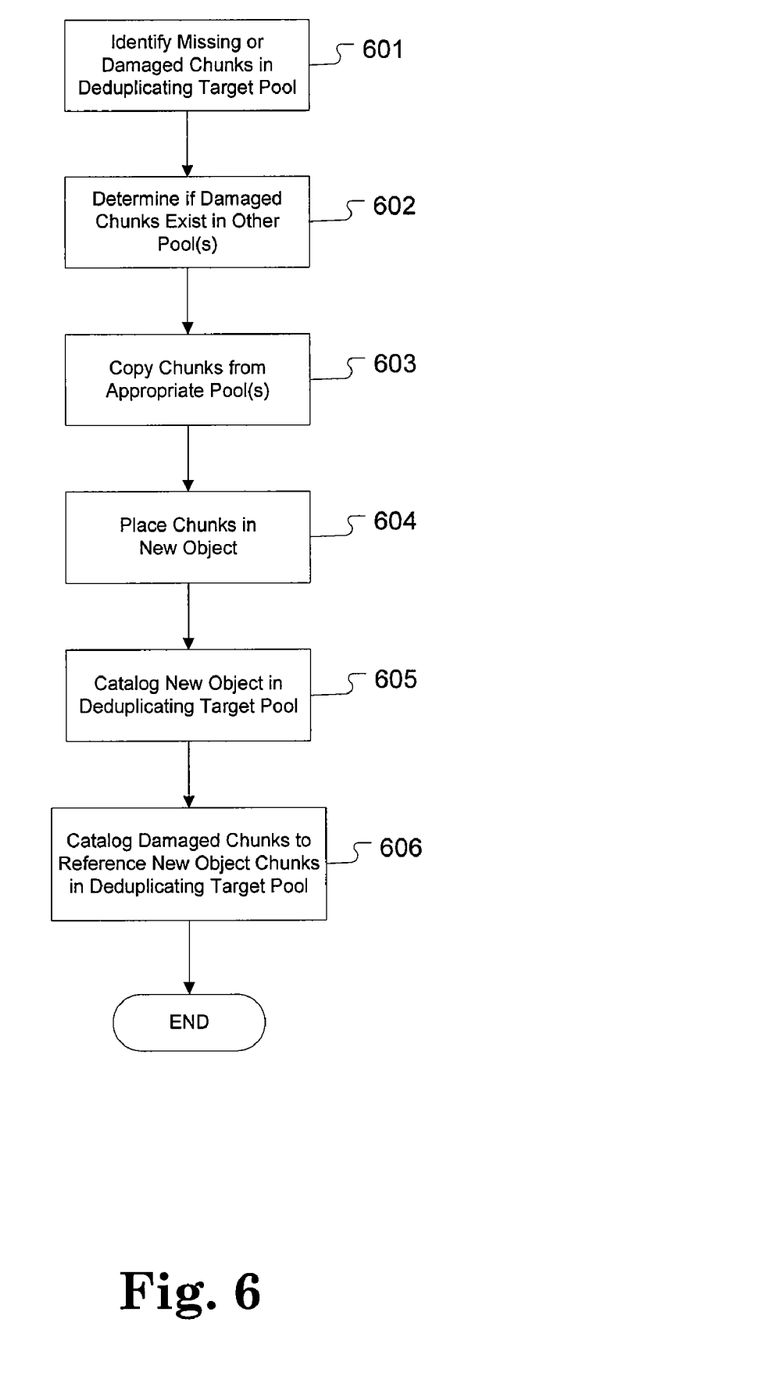
FIG. 6 illustrates a flowchart representative of an example operation for restoring chunks on a storage pool in a deduplicating storage management system according to one embodiment of the present invention.

FIG. 6 depicts a flowchart algorithm illustrating an operation for restoring chunks on a storage pool in accordance with one embodiment of the present invention. First, as in step 601, identify the chunks in a deduplicating pool (further referred to as the deduplicating "target" pool) which are damaged or missing. Chunks which are missing are easy to detect. For example, if $O_2$ links to $X_1$, and $X_1$ does not exist on the pool, chunk $X_1$ can be determined as missing. Similarly, damaged chunks may be easily identified if any errors occur when the chunks are attempted to be retrieved. For example, if object O contains chunks $O_1$, $O_2$, and $O_3$ and chunk $O_3$ is either physically damaged (preventing a read of its data) or logically damaged (containing unexpected contents within its chunk), the damaged $O_3$ chunk can be detected at the time that object O is attempted to be accessed within the storage pool.

Next, as in step 602, the system-wide storage management index is checked (either by name or signature) to verify if replacement copies of the damaged or missing chunk exist in other pools. This step is repeated for any other missing or damaged chunks. The identification of the replacement chunks are then grouped by storage pool. As in step 603, the chunks are copied from the appropriate pool. Thus, if three chunks will be restored from copy pool 1, and two chunks will be restored from copy pool 2, the three chunks will be copied from pool 1, followed by the two chunks being copied from pool 2, generally using a data transfer process to a target deduplicating pool similar to the data process illustrated within FIG. 4. However, unlike the scenario in FIG. 4, the chunk will be copied unconditionally even if chunks with the same signature exist in the target pool, because damaged chunks would appear with the same signature.

As in step 604, the replacement chunks are collected and placed in a new object. This new object is then catalogued within the deduplicating target pool as in step 605. After the chunks exist on the target pool within the new object, the chunks are cataloged in the target storage pool as in step 606. This involves having all entries which point to the damaged or missing chunk to be updated to reference the new replacement chunk in the new object which was just created within the deduplicating target pool. In one further embodiment of the present invention, new ID numbers are assigned to each chunk during the transfer.

To illustrate the previously described steps with an example, if $X_1$ was a damaged chunk on the deduplicating target pool, a replacement chunk with the same signature from a copy pool is retrieved and given a name of $Z_1$. The chunk is transferred onto the deduplicating target pool inside of a new data object which contains $Z_1$. Any links which pointed to the damaged chunk, such as link $O_2$ which pointed to $X_1$, are then updated to point to $Z_1$. These operations are easily facilitated by storing the chunk signature and storage information in the index at the storage management system level.

In a further embodiment, at the time that a new "container" data object is created in the target pool to hold the undamaged copy of the new chunks, a separate container data object may be utilized for each storage pool. Thus, as an example to replace five damaged data chunks on the target pool, three chunks from pool 1 may be placed in new object Z, and two chunks from pool 2 may be placed in a different object W. Accordingly, each of the replacement chunks may be placed into either a single container data object or multiple container data objects without affecting the result of the retrieval or recovery operations.

Figure 7:
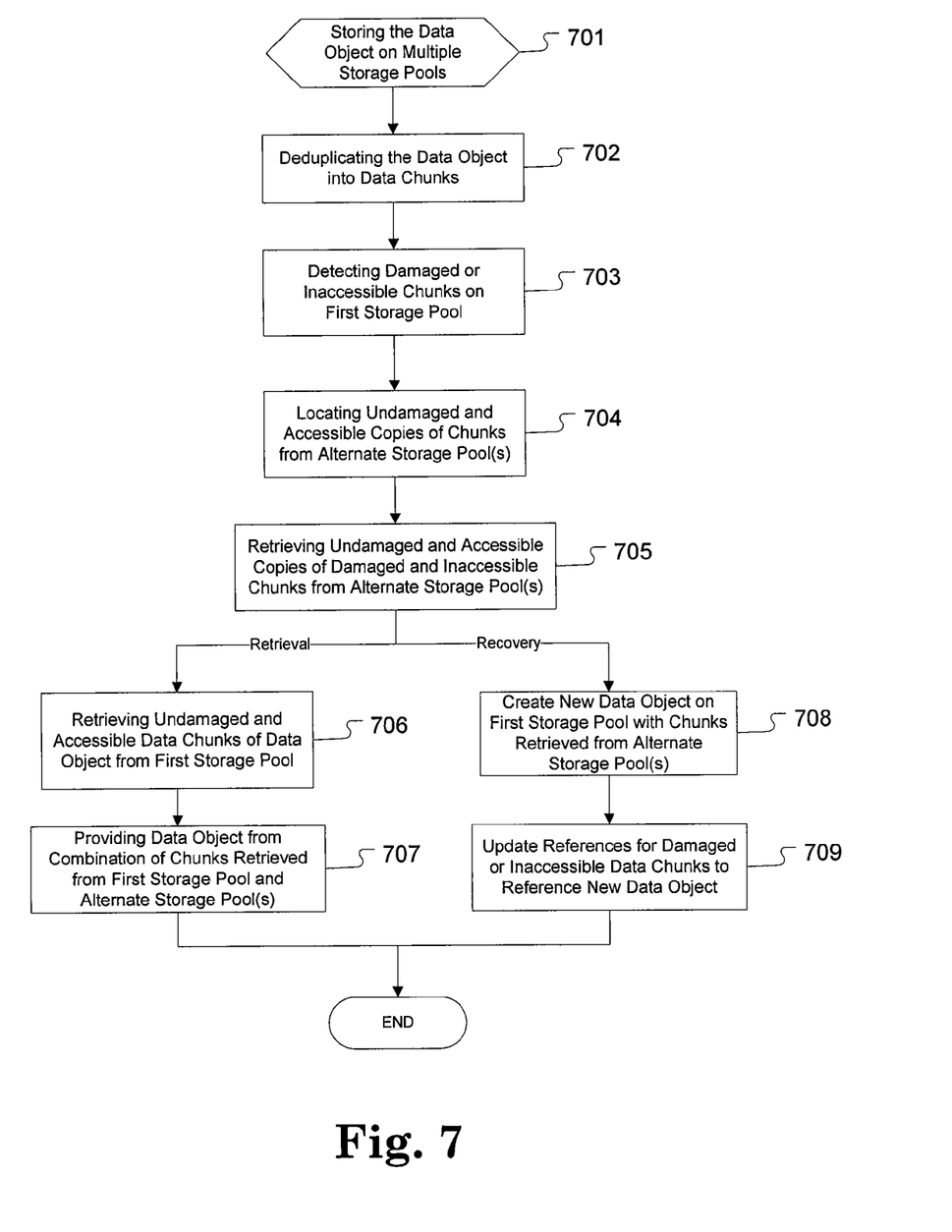
FIG. 7 illustrates a flowchart representative of an example operation for performing a retrieval or recovery of data chunks from alternate data stores in a deduplicating storage management system according to one embodiment of the present invention.

FIG. 7 depicts a flowchart for the overall operation of enabling and performing the retrieval and/or recovery of data chunks from alternate data stores in a deduplicating system in accordance with one embodiment of the present invention. First, a data object containing one or more data chunks is stored on a plurality of storage pools within the storage management system as in step 701. In a typical configuration, this will include storage on a primary storage pool, and storage on a backup or other alternate storage pool. Next, the data chunks of the data object are deduplicated within one or more of the storage pools as in step 702, with this deduplication information being stored at the system management level and accessible to each of the storage pools.

Next, damaged or inaccessible chunks are detected on a first storage pool which contains the data object as in step 703. This detection may occur either at the time of data retrieval, or upon the operation of a data integrity process. Accordingly, an undamaged and accessible copy of the damaged or inaccessible data chunks of the data object are located on one or more alternate storage pools within the storage management system as in step 704, and retrieved from these alternate storage pools as in step 705.

In one embodiment, the next steps performed are dependent on whether the damaged or inaccessible data object is simply being retrieved, or whether the damaged or inaccessible data object is being recovered to correct data integrity problems. If retrieval is taking place, the undamaged and accessible data chunks of the data object are retrieved from the first storage pool as in step 706. The data object is then provided with a combination of the chunks retrieved from the first storage pool and the alternate storage pools as in step 707.

In the case that a recovery of damaged or inaccessible chunks of the data object is taking place, then a new data object is created containing the undamaged and accessible copies of the data object retrieved from the one or more alternate storage pools as in step 708. This new data object is created on the first storage pool, and may contain chunks collected from multiple alternate storage pools. Next, as in step 709, references on the first storage pool to the damaged or inaccessible data chunks are updated to reference the undamaged and inaccessible chunks of the new data object. Not only are references to damaged chunks updated, but the damaged chunk itself is updated to become a link to the restored chunk.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method in a computer system for performing retrieval and recovery of data chunks from alternate data stores within a storage management system, comprising:
    storing a data object containing one or more data chunks onto a plurality of storage pools within the storage management system, wherein the storage pools each comprise one of a deduplicating pool and a non-deduplicating pool;
    deduplicating the data chunks of the data object within one or more of the plurality of storage pools, wherein a single data deduplication information index, which contains an entry for each data chunk of the deduplicated data object, is stored on a storage management system-wide level;
    detecting a first inaccessible data chunk of the data object within a first storage pool within the plurality of storage pools;
    locating an undamaged and accessible copy of the first inaccessible data chunk in one or more alternate storage pools within the plurality of storage pools by referencing the entries for the undamaged and accessible copy in the system-wide deduplication index;
    retrieving the undamaged and accessible copy of the first inaccessible data chunk from the one or more alternate storage pools to the first storage pool;
    creating a new object holding the undamaged and accessible copy;
    cataloging the new data object within the deduplicating pool;
    assigning new identifiers to the undamaged and accessible copy; and
    linking the first inaccessible data chunk to the undamaged and accessible copy.

2. The method as in claim 1, further comprising:
    providing the data object from a combination of the undamaged and accessible data copy retrieved to the first storage pool and second undamaged and accessible data copies retrieved from the one or more alternate storage pools within the storage management system.

3. The method as in claim 2, wherein remaining data chunks of the data object are retrieved from the one or more alternate storage pools subsequent to retrieving the first undamaged and accessible copy of the first inaccessible data chunk of the data object from the one or more alternate storage pools.

4. The method as in claim 1, wherein only copies of the first inaccessible data chunk within the first storage pool are retrieved from the one or more alternate storage pools.

5. The method as in claim 1, further comprising:
    updating references for the first inaccessible data chunk to reference the new object chunks in the first storage pool.

6. The method as in claim 1, wherein one or more of the alternate storage pools comprise tape storage media.

7. A system, comprising:
    at least one processor; and
    at least one memory which stores instructions operable with the at least one processor for performing a retrieval and recovery of data chunks from alternate data stores in a storage management system, the instructions being executed for:
    storing a data object containing one or more data chunks onto a plurality of storage pools within the storage management system, wherein the storage pools each comprise one of a deduplicating pool and a non-deduplicating pool;
    deduplicating the data chunks of the data object within one or more of the plurality of storage pools, wherein a single data deduplication information index, which contains an entry for each data chunk of the deduplicated data object, is stored on a storage management system-wide level;
    detecting a first inaccessible data chunk of the data object within a first storage pool within the plurality of storage pools;
    locating an undamaged and accessible copy of the first inaccessible data chunk in one or more alternate storage pools within the plurality of storage pools by referencing the entries for the undamaged and accessible copy in the system-wide deduplication index;
    retrieving the undamaged and accessible copy of the first inaccessible data chunk from the one or more alternate storage pools;
    creating a new object holding the undamaged and accessible copy;
    cataloging the new data object within the deduplicating pool;
    assigning new identifiers to the undamaged and accessible copy; and
    linking the first inaccessible data chunk to the undamaged and accessible copy.

8. The system of claim 7, further comprising:
    providing the data object from a combination of the undamaged and accessible data copy retrieved from the first storage pool and the undamaged and accessible data copies retrieved from the one or more alternate storage pools within the storage management system.

9. The system of claim 7, wherein remaining data chunks of the data object are retrieved from the one or more alternate storage pools subsequent to retrieving the undamaged and accessible copy of the first inaccessible data chunk of the data object from the one or more alternate storage pools.

10. The system of claim 7, wherein only copies of the first inaccessible data chunk within the first storage pool are retrieved from the one or more alternate storage pools.

11. The system of claim 7, further comprising:
    updating references for the first inaccessible data chunks to reference the new object chunks in the first storage pool.

12. The system of claim 7, wherein one or more of the alternate storage pools comprise tape storage media.

13. A computer program product for performing a retrieval and recovery of data chunks from alternate data stores in a storage management system, the computer program product comprising:
    a tangible computer readable storage medium storing computer readable program code embodied therein, the computer readable program code, when executed by a processor, is configured to:
    store a data object containing one or more data chunks onto a plurality of storage pools within the storage management system, wherein the storage pools each comprise one of a deduplicating pool and a non-deduplicating pool;

deduplicate the data chunks of the data object within one or more of the plurality of storage pools, wherein a single data deduplication information index, which contains an entry for each data chunk of the deduplicated data object, is stored on a storage management system-wide level;

detect a first inaccessible data chunks of the data object within a first storage pool within the plurality of storage pools;

locate an undamaged and accessible copy of the first inaccessible data chunk in one or more alternate storage pools within the plurality of storage pools by referencing the entries for the undamaged and accessible copy in the system-wide deduplication index;

retrieve the undamaged and accessible copy of the first inaccessible data chunks from the one or more alternate storage pools to the first storage pool;

creating a new object holding the undamaged and accessible copy;

cataloging the new data object within the deduplicating pool;

assigning new identifiers to the undamaged and accessible copy; and linking the first inaccessible data chunk to the undamaged and accessible copy.

14. The computer program product of claim 13, further comprising:

providing the data object from a combination of the undamaged and accessible data chunks retrieved to the first storage pool and second undamaged and accessible data chunks retrieved from the one or more alternate storage pools within the storage management system.

15. The computer program product of claim 13, wherein remaining data chunks of the data object are retrieved from the one or more alternate storage pools subsequent to retrieving the undamaged and accessible copy of the first inaccessible data chunk of the data object from the one or more alternate storage pools.

16. The computer program product of claim 13, wherein only copies of the first inaccessible data chunk within the first storage pool are retrieved from the one or more alternate storage pools.

17. The computer program product of claim 13, further comprising:

updating references for the first inaccessible data chunk to reference the new object chunks in the first storage pool.

18. The computer program product of claim 13, wherein one or more of the alternate storage pools comprise tape storage media.

* * * * *